United States Patent
Cooks et al.

(10) Patent No.: US 12,157,126 B2
(45) Date of Patent: Dec. 3, 2024

(54) SYSTEMS AND METHODS FOR SYNTHESIZING A REACTION PRODUCT AND INCREASING YIELD OF THE SAME

(71) Applicant: Purdue Research Foundation, West Lafayette, IN (US)

(72) Inventors: Robert Graham Cooks, West Lafayette, IN (US); Zhenwei Wei, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 222 days.

(21) Appl. No.: 17/183,691

(22) Filed: Feb. 24, 2021

(65) Prior Publication Data

US 2021/0299666 A1    Sep. 30, 2021

Related U.S. Application Data

(60) Provisional application No. 62/994,526, filed on Mar. 25, 2020.

(51) Int. Cl.
*B01L 7/00* (2006.01)
*B01L 7/02* (2006.01)

(52) U.S. Cl.
CPC ............. *B01L 7/52* (2013.01); *B01L 7/02* (2013.01); *B01L 2300/087* (2013.01); *B01L 2300/1894* (2013.01); *B01L 2400/0487* (2013.01)

(58) Field of Classification Search
CPC .............. G06Q 30/02; G06Q 30/0241; G06Q 30/0265; G06Q 30/0266; G09F 21/04;
(Continued)

(56) References Cited

U.S. PATENT DOCUMENTS 8,859,956 B2    10/2014  Ouyang et al.
2008/0281090 A1* 11/2008  Lee ................... B01J 19/0093
                                                        422/600

(Continued)

FOREIGN PATENT DOCUMENTS

WO    WO-199300625 A1 *  1/1993  .......... B01J 19/0046
WO    2009/102766 A1      8/2009

OTHER PUBLICATIONS

Nie et al "High-yield gram-scale organic synthesis using accelerated microdroplet/thin film reactions with solvent recycling" Chem. Sci., 2020, 11, 2356 (Year: 2020).*

(Continued)

*Primary Examiner* — Jennifer Wecker
*Assistant Examiner* — Jonathan Bortoli
(74) *Attorney, Agent, or Firm* — Brown Rudnick LLP; Adam M. Schoen

(57) ABSTRACT

The invention generally relates to systems and methods for synthesizing a reaction product and increasing yield of the same. In certain aspects, the invention provides a multi-mode reaction system in which in a first mode one or more valves of the system are configured to cause reagents to flow from one or more reagent reservoirs of the system through one or more components of the system to generate a reaction product; and in a second mode the one or more valves are configured to change flow within the system such that the one or more reagent reservoirs are isolated from a remainder of the system and the generated reaction product and any remaining reactants are recycled back through the multi-mode reaction system to increase a yield of the reaction product.

8 Claims, 10 Drawing Sheets

(58) Field of Classification Search
CPC ........ H04L 67/52; H04W 4/02; H04W 4/023; H04W 4/029; H04W 4/80; G01S 19/42; G06F 3/14; H04B 1/40; Y02P 10/20; B01J 19/0006; B01J 2204/002; B01L 2300/087; B01L 2300/1894; B01L 2400/0487; B01L 7/02; B01L 7/52

See application file for complete search history.

(56) References Cited

U.S. PATENT DOCUMENTS

2018/0043327 A1* 2/2018 Cooks ................ B01D 19/0031
2019/0352247 A1* 11/2019 Zare .................... B01F 23/2132

OTHER PUBLICATIONS

Li ("The Role of the Interface in Thin Film and Droplet Accelerated Reactions Studied by Competitive Substituent Effects") Angewandte Chemie International Edition—Angew. Chem. Int. Ed. VL-55 IS-10 SN-1433-7851 UR—https://doi.org/10.1002/anie.201511352 (Year: 2016).*

Carroll, 1975, Atmospheric pressure ionization mass spectrometry. Corona discharge ion source for use in a liquid chromatograph-mass spectrometer-computer analytical system, Analytical Chemistry, 47(14):2369-2373.

Cody, 2005, Versatile New Ion Source for the Analysis of Materials in Open Air under Ambient Conditions, Anal. Chem. 77:2297-2302.

Fenn, 1989, Electrospray ionization for mass spectrometry of large biomolecules, Science, 246:64-71.

Fico, 2007, Miniaturization and Geometry Optimization of a Polymer-Based Rectilinear Ion Trap, Anal. Chem., 79:8076-8082.

Gao, 2006, Handheld Rectilinear Ion Trap Mass Spectrometer, Anal. Chem., 78:5994-6002.

Gao, 2008, Design and Characterization of a Multisource Hand-Held Tandem Mass Spectrometer, Z. Anal. Chem. 80:7198-7205.

Hou, 2011, Sampling Wand for an Ion Trap Mass Spectrometer, Anal. Chem, 831857-1861.

Karas, 2000, Nano-electrospray ionization mass spectrometry: addressing analytical problems beyond routine, Fresenius J Anal Chem, 366(6-7):669-676.

Kogelschatz, 2003, Dielectric-Barrier Discharges: Their History, Discharge Physics, and Industrial Applications, Plasma Chemistry and Plasma Processing, 23:1-46.

Laiko, 2000, Atmospheric Pressure Matrix-Assisted Laser Desoprtion/Ionization Mass Spectrometry, Analytical Chemistry, 72:652-657.

Mulligan, 2006, Desorption electrospray ionization with a portable mass spectrometer: in situ analysis of ambient surfaces, Chem. Com., 709-1711.

Ouyang, 2009, Handheld Miniature Ion trap Mass Spectrometers, Anal Chem, 81(7):2421-2425.

Ouyang, 2009, Miniature Mass Spectrometers, Ann Rev Anal Chem, 2:187-214.

Pan, 2004, Nanoelectrospray Ionization of Protein Mixtures: Solution pH and Protein p/, Anal. Chem. 76(4):1165-1174.

Sanders, 2009, Hand-held mass spectrometer for environmentally relevant analytes using a variety of sampling and ionization methods, Euro J Mass Spectrom, 16:11-20.

Santos, 2011, Venturti Easy Ambient Sonic-Spray Ionization, Analytical Chemistry, 83(4):1375-1380.

Shiea, 2005, Electrospray-assisted laser desorption/ionization mass spectrometry for direct ambient analysis of solids, J. Rapid Communications in Mass Spectrometry, 19:3701-3704.

Sokol, 2011, Miniature mass spectrometer equipped with electrospray and desorption electrospray ionization for direct analysis of organics from solids and solutions, Int J Mass Spectrom, 306:187-195.

Takats, 2004, Electronsonic Spray Ionization. A Gentle Technique for Generating Folded Proteins and Protein Complexes in the Gas Phase and for Studying Ion-Molecule Reactions at Atmospheric Pressure, Anal. Chem., 76(14):4050-4058.

Tanaka, 1988, Protein and polymer analyses up to m/z 100 000 by laser ionization time-of-flight mass spectrometry, Rapid Commun. Mass Spectrom., 2:151-153.

Xu, 2010, Miniaturization of Mass Spectrometry Analysis Systems, JALA, vol. 15: pp. 433-439.

Yamashita, 1984, Electrospray ion source. Another variation on the free-jet theme, J. Phys. Chem, 88(20):4451-4459.

* cited by examiner

SYSTEMS AND METHODS FOR SYNTHESIZING A REACTION PRODUCT AND INCREASING YIELD OF THE SAME

RELATED APPLICATION

The present application claims the benefit of and priority to U.S. provisional application Ser. No. 62/994,526, filed Mar. 25, 2020, the content of which is incorporated by reference herein in its entirety.

GOVERNMENT INTEREST

This invention was made with government support under CHE1905087 awarded by the National Science Foundation, and W911NF-16-2-0020 awarded by the Army Research Office on behalf of the Defense Advanced Projects Research Agency. The government has certain rights in the invention.

FIELD OF THE INVENTION

The invention generally relates to systems and methods for synthesizing a reaction product and increasing yield of the same.

BACKGROUND

Chemical reactions and biological processes in small confined volumes such as single cells and subcellular spaces are intrinsic to a deep understanding of life. During the past decade, a number of mass spectrometry based studies have described accelerated reactions in small confined volumes such as microdroplets and thin films. The partial solvation of reactants near the microdroplet-gas interface, the extremes in pH of microdroplets, fast solvent evaporation, special electric field and dipoles near interface and enhanced mass transfer make these reactions notably faster than in bulk. Although reaction rate accelerations of 101 to 105 times relative to bulk have been achieved in microdroplets, the small scale of the experiments and the failure to recycle the solvent have to be addressed to make this a practical approach to chemical synthesis. Specifically, i) microdroplet reaction yields are restricted by the limited reaction time allowed due to the short lifetimes of microdroplets generated by electrospray, pneumatic spray and ultrasonic spray. ii) The reaction scale suffers from the small volumes of the droplets (chosen because small volumes provide high acceleration factors). iii) Large amounts of solvent are wasted which is undesirable from green chemistry considerations.

SUMMARY

A closed system has been designed to perform microdroplet/thin film reactions with solvent recycling capabilities for gram-scale chemical synthesis. Based on exemplary reaction schemes run on systems and methods of the invention (e.g., Claisen-Schmidt, Schiff base, Katritzky and Suzuki coupling reactions), the data show acceleration factors relative to bulk (14 to 7,700 times) in this droplet spray approach. The solvent recycling mode of the new system significantly improves the reaction yield, especially for reactions with small reaction acceleration factors. The microdroplet/thin film reaction yield improved on recycling from 33% to 86% and from 32% to 72% for the Katritzky and Suzuki coupling reactions, respectively. The Claisen-Schmidt reaction was chosen to test the capability of this system in gram scale syntheses and rates of 3.18 g/hr and an isolated yield of 87% were achieved.

In certain aspects the invention provides a multi-mode reaction system in which in a first mode one or more valves of the system are configured to cause reagents to flow from one or more reagent reservoirs of the system through one or more components of the system to generate a reaction product; and in a second mode the one or more valves are configured to change flow within the system such that the one or more reagent reservoirs are isolated from a remainder of the system and the generated reaction product and any remaining reactants are recycled back through the multi-mode reaction system to increase a yield of the reaction product. The invention also provides methods of using such a system.

In certain embodiments of the systems and methods, the multi-mode reaction system comprises a first valve between the one or more reagent reservoirs and a pump and a second valve between the one or more components of the system and the pump. In such embodiments, in the first mode, the first valve is open and the second valve is closed. In other such embodiments, the second mode the second valve is open and the first valve is closed. In certain embodiments of the systems and methods, the multi-mode reaction system comprises a channel coupled to a gas line located after the pump and configured such hat the channel produced a pneumatic spray of the reagents into a first reaction reservoir of the multi-mode reaction system in a manner that a reaction rate of the reagents within the droplets is accelerated as compared to a reaction rate of the reagents under bulk-non-droplet conditions. In certain embodiments, a reaction of the reagents occurs within the first reaction reservoir, which is under heating conditions, and the reaction product is flowed from the first reaction reservoir to a second reaction reservoir. In certain embodiments, the reaction product is condensed in the second reaction reservoir, which is under cooling conditions. In certain embodiments, the reaction product and any unreacted reagents are flowed from the second reaction reservoir and through a channel operably coupled to the second valve and back through the pump and the multi-mode reaction system to increase the reaction yield, wherein the second valve is in the open position and the first valve is in the closed condition.

Depending on the desired set-up, the reagents may be in a single reaction reservoir or the reagents may be in multiple reaction reservoirs.

In other aspects, the invention provides a system for producing a reaction product that includes a pump (e.g., a peristaltic pump); a first chamber operably coupled to the pump; a first channel comprising a first inlet that is operably coupled to the pump, wherein the first channel comprises a coupling for a gas line and further comprises a first outlet; a second chamber configured to receive the outlet of the channel; a third chamber operably coupled to the second chamber; and a second channel comprising a second inlet operably coupled to the third chamber and further comprising a second outlet operably coupled to the pump.

In certain embodiments, the system also includes a first valve positioned between the first chamber and the pump. In certain embodiments, the second channel comprises an inline second valve between the second inlet and the second outlet. In certain embodiments, the system further comprising a gas reservoir and a gas line that operably couples to the coupling of the first channel that causes a discharge from the first outlet to be in the form of a pneumatic spray. In certain embodiments the first, second, and/or third chamber is pressurized. In certain embodiments, the system further comprises a heating element operably coupled to the second chamber, for example, the heating element may be a heated water bath. In certain embodiments, the system further includes a cooling element operably coupled to the third chamber, for example, the cooling element may be a dry-ice bath.

DETAILED DESCRIPTION

To address the yield and scale issues, microdroplet collection experiments have been performed. In 2012, preparative electrospray was used to scale up the Claisen-Schmidt condensation reaction; the reaction mixture was electrosprayed at flow rate of 10 μL/min and directed into a polyethylene vessel containing glass wool to collect the product. Once the microdroplets hit the wall of the vessel or the wool fiber, they form an electroneutral thin film of reaction solution. If reaction is incomplete in the droplets it then can occur in this thin film. Although the reported reaction acceleration factors in thin films are not as large as in microdroplets, the reaction yields can be much higher due to the increased reaction time, as confirmed by dropcast thin film reactions. For this first 2012 preparative electrospray synthesis, the reaction scale was 35.3 mg/hr (four sprayers, 90% yield). In 2017, deposition of uncharged microdroplets generated by sonic spray was used to fabricate a dynamic thin film for continuous synthesis. Again for Claisen-Schmidt reactions, the uncharged microdroplet and thin film reactions showed similar kinetics and yields to those in charged droplets, however, a larger reaction scale (120 mg/hr; one sprayer, 80% yield) could be achieved due to the greater flow rate allowed in the sonic spray. Commercial pneumatic sprayers can support even greater flow rates, which means a much larger reaction scale, however, the droplet size is then too large for significant microdroplet reaction acceleration. In 2018, by choosing mesh materials with micrometer scale holes, a pneumatic sprayer was used to generate size-controlled microdroplets at a very high flow rate (8 mL/min). A particular aldehyde oxidation reaction was run at a scale of 630 mg/hr (one sprayer, 66% yield). Multiplexing is always a favorable strategy to achieve a larger scale. For example, the scale of two-phase microdroplet reactions could be increased by using multiple sprayers. Similarly, paper spray microdroplet reactions can be multiplexed by using paper with multiple tips.

In light of this examination of earlier studies of scaled-up microdroplet synthesis, we note that although a variety of scale-up methods have been developed and larger scales have been achieved recently, the limited reaction time and lack of solvent recycling remain issues that are inadequately addressed. With a focus on these issues, we describe a new system for microdroplet synthesis with major improvements in reaction yield, product collection efficiency and solvent economy. The system can operate on the mg/hr to g/hr scale.

Figure 1A:
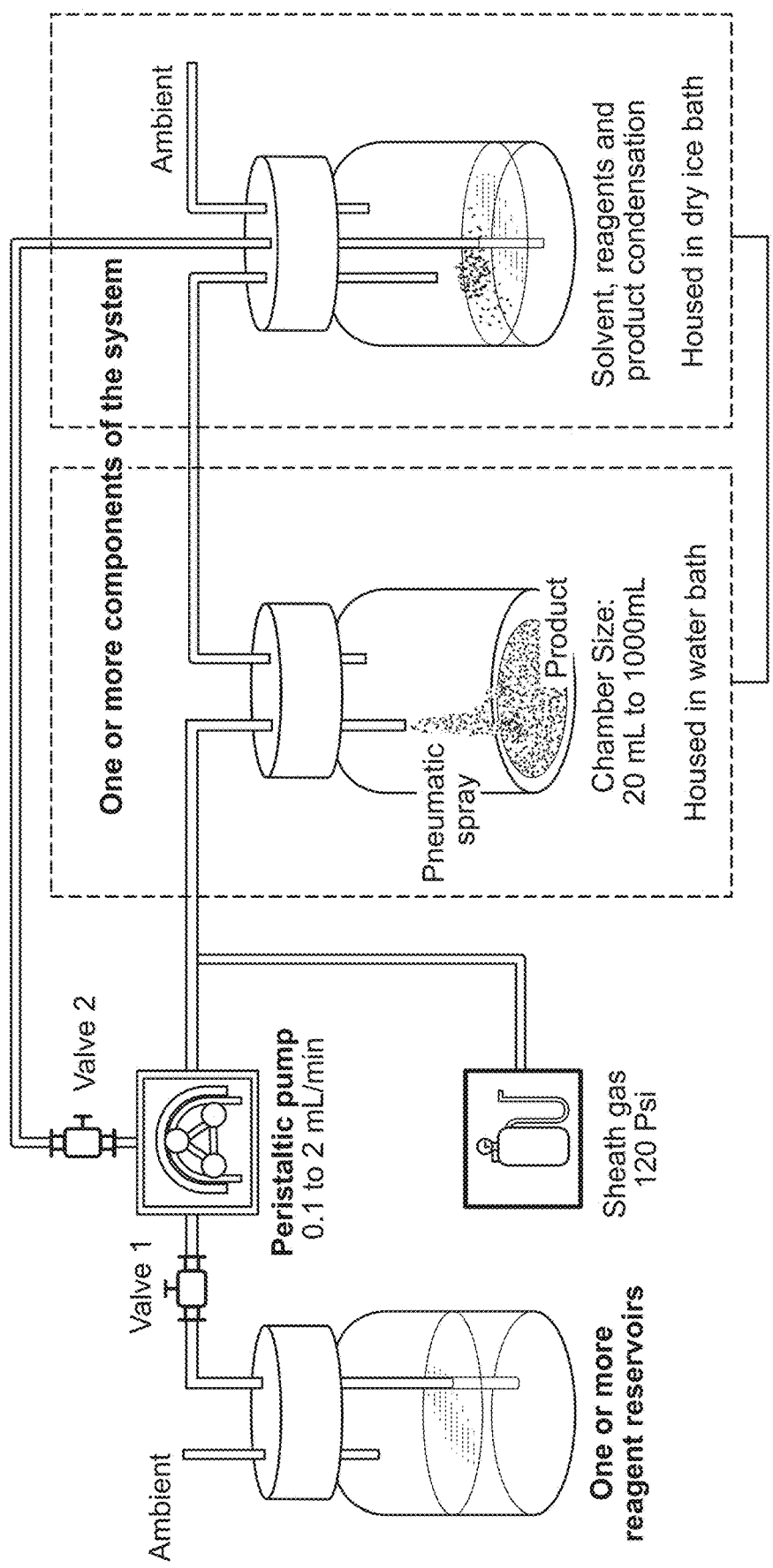
FIG. 1A shows a system for microdroplet synthesis on the mg/hr to g/hr scale.
Figure 1B:
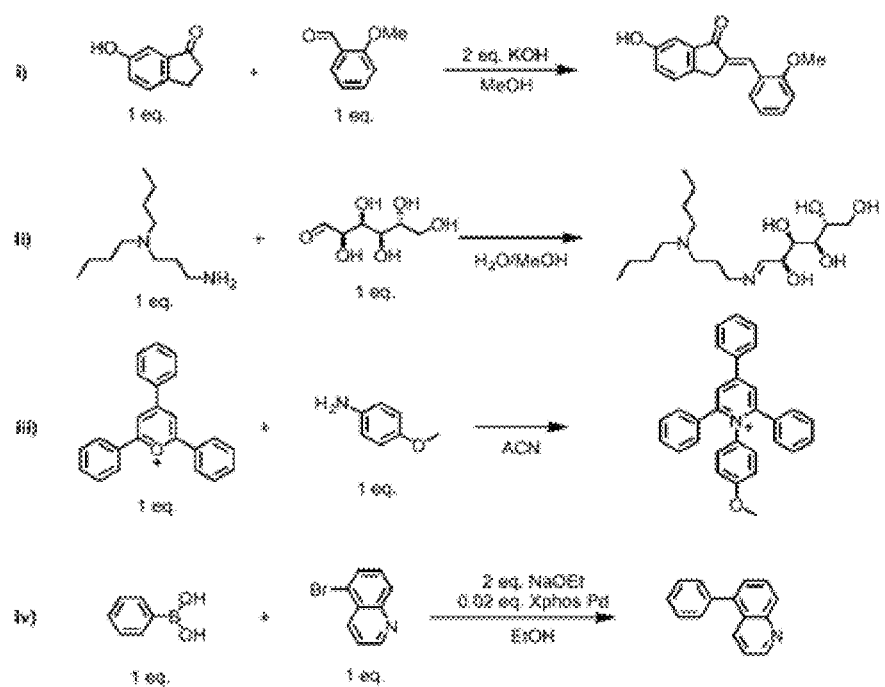
FIG. 1B shows reactions interrogated using the new scale-up synthesis system. 1) Claisen-Schmidt reaction; 2) Schiff base reaction; 3) Katritzky reaction; 4): Suzuki reaction.

As shown in FIG. 1A, a peristaltic pump is used to introduce the reaction mixture from a reservoir, as well as to transfer the condensate back to the microdroplet reaction chamber. High-pressure nitrogen is used as a sheath gas to assist with nebulization and for protection of air/water sensitive reagents. As the synthesis begins, valve 1 is open and valve 2 is closed; the reaction mixture is transferred from the reservoir to the spray chamber to perform microdroplet and thin film reactions. The condensation chamber is used to collect the reagent—and product-containing vapors and nanodroplets. When the desired volume of reaction mixture had been transferred, valve 1 was closed and valve 2 opened, placing the system in the solvent recycling mode. During this time, reaction condensate is transferred back to the sprayer continuously to allow microdroplet and thin film reactions to proceed in the reaction chamber. This helps increase reaction time and product yield. We have performed various reactions using this new system, including typical C—C and C—N bond formation reactions, ring opening and closing reactions and coupling reactions, as listed in FIG. 1B. In certain embodiments, the reactants are more volatile than the produced reaction product.

All microdroplet reactions were performed at a concentration of 10 mM with equimolar reactants. For the Claisen-Schmidt reaction, 2 eq. of KOH were used to catalyze the reaction; for the Suzuki reaction, 2 eq. of EtONa and 0.02 eq. Xphos G3 were used as catalyst. The corresponding bulk reactions were run at these concentrations in 20 mL capsealed glass vials containing 3 mL reaction mixture and placed in an incubator and run at the desired temperatures (25° C. for Claisen-Schmidt and Katritzky reactions, 65° C. for Schiff base and Suzuki reactions). The microdroplet reactions used a flow rate of 100 μL/min to spray reaction mixture into the reaction chamber housed in a water bath. The concentration of reaction mixture and the chamber temperature were the same as those used for the corresponding bulk reactions. At selected times after starting a reaction, the reaction mixture (the sprayed reaction mixture plus the condensate) was quenched by dilution with quenching solution (pH adjustment of quenched solution was necessary for the Suzuki reaction) prior to subsequent nanoelectrospray mass spectrometry (nESI-MS) analysis under standard non-accelerating conditions. By comparing the peak intensity of reactant and product ions in these mass spectra, and correcting for the difference in ionization efficiency, reaction yields were estimated from equation (1):

$$\text{Yield} = \frac{I_P}{I_P + I_R \cdot f} = \frac{I_P/I_R}{I_P/I_R + f} \tag{1}$$

where $I_P$ and $I_R$ are the peak intensities of the product and reactant, respectively. The constant f reflects the difference in product and reagent ionization efficiency, defined as:

$$f = \frac{I_P/I_R}{[P]/[R]} \quad (2)$$

Constant f was measured by spiking reactant into diluted and quenched reaction mixture to measure the corresponding peak intensities in the mass spectra.

We investigated the kinetics and thermodynamics of microdroplet reactions in our system and made comparisons with bulk reactions. Organic reactions are often reversible so we investigated their reaction kinetics in the kinetic control regime, where the influence of the back reaction can be ignored. All four chosen reactions are pseudo $2^{nd}$ order reactions (based previous reports), hence the slope of the plot of [P]/[R] vs. reaction time should be the product of reagent concentration ($c_0$) and rate constant (k). This information can then be used to evaluate the apparent reaction acceleration factor (AAF, AAF=$(c_0k)_{droplet}/(c_0k)_{bulk}$) of the different chemical systems. It is noteworthy that there is a concentration effect on AAF.

Figure 2A:
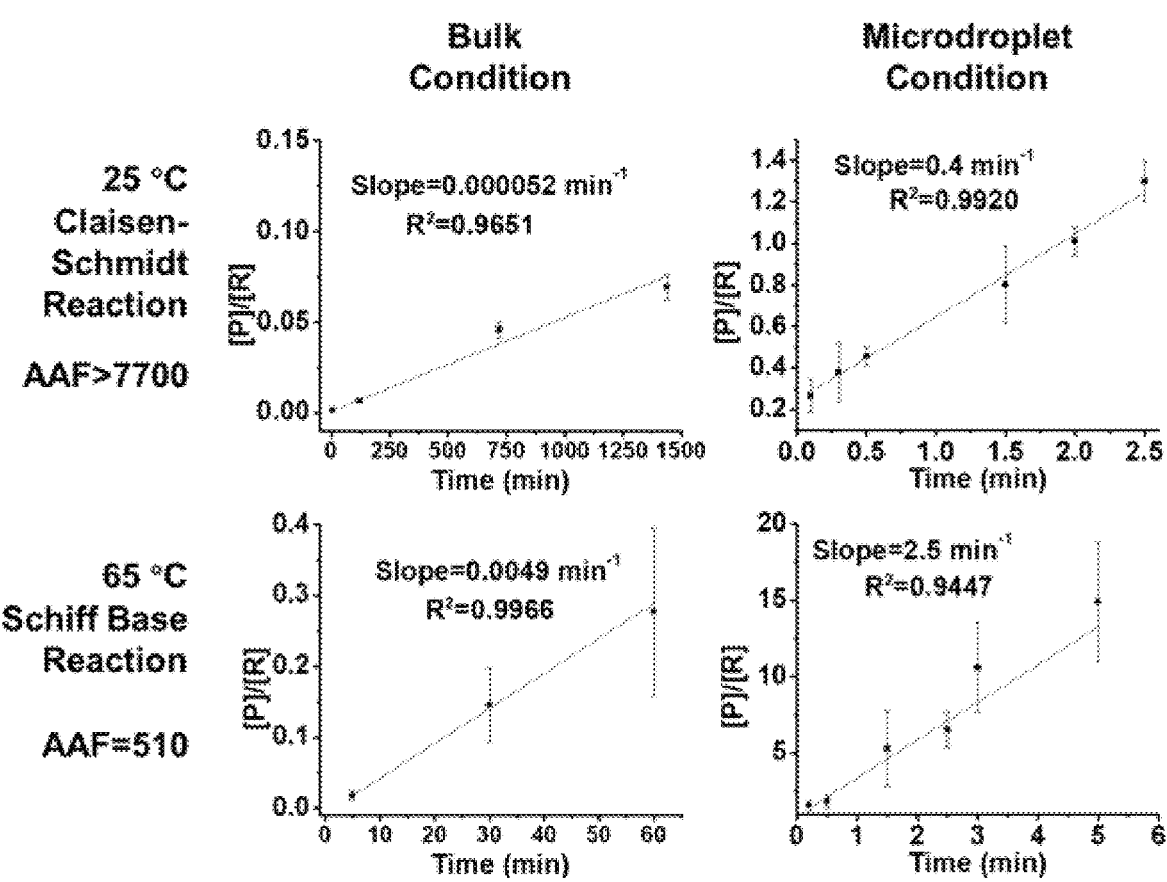
FIGS. 2A-B show kinetics curves and apparent acceleration factors (AAF). In order to obtain measurable kinetics curves in bulk, 20 equivalent KOH had to be used as opposed to 2 equiv. in droplets.
Figure 2B:
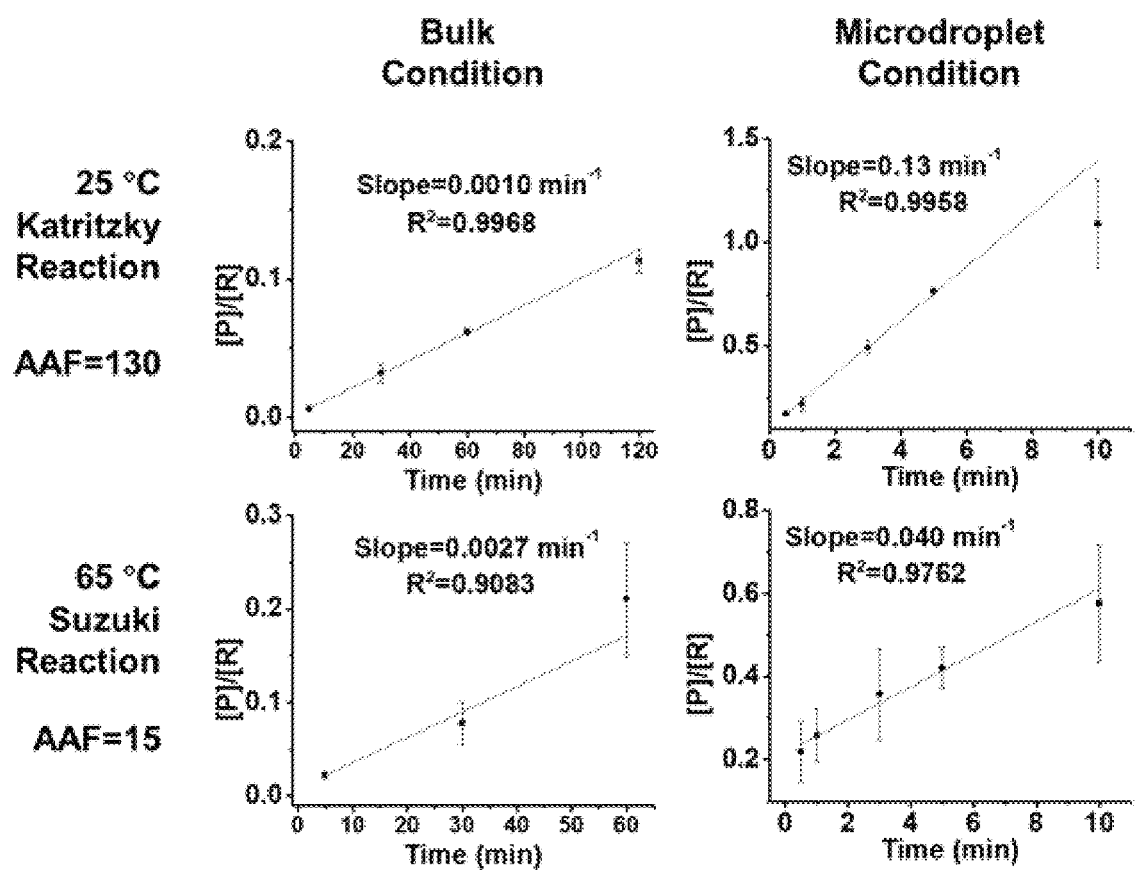

As shown in FIGS. 2A-B, the slopes of the Claisen-Schmidt, Schiff base, Katritzky and Suzuki coupling reactions in bulk are 0.000052 $min^{-1}$, 0.0014 $min^{-1}$, 0.0049 $min^{-1}$ and 0.0029 $min^{-1}$, respectively; the slopes derived from the microdroplet reactor are 0.40 $min^{-1}$, 0.18 $min^{-1}$, 2.5 $min^{-1}$ and 0.050 $min^{-1}$, respectively. Taking the ratio of the slopes recorded under bulk and microdroplet conditions, and noting that both sets of experiments used the same initial concentrations, we note that the Claisen-Schmidt reaction has a very large AAF of ca. 7700, while the Schiff base and Katritzky reactions have moderate AAFs of 510 and 130, respectively, and the Suzuki coupling reaction shows a small AAF of 17 (only 17 times faster than bulk). For the Claisen-Schmidt reaction, a model reaction often examined in microdroplet/thin film reaction acceleration studies, we note that the AAF in this new system is 7,700, which is significantly higher than our previously reported value of 1,000 in microdroplet product collection experiments. This improvement can be due to enhanced microdroplet collection efficiency, especially more efficient collection of the smallest droplets. It is important to emphasize that the apparent acceleration factor in these experiments, while a relative measure of rate constants, includes droplets of a range of sizes. As already noted, there is a strong inverse size effect on rate constants because reactions at the microdroplet/air interface are the main contributors to reaction acceleration. The closed reaction system will, no doubt, increase the collection efficiency of small sized droplets compared to ambient collection conditions and hence increase the apparent acceleration factor measured. However, it must be acknowledged that not every reaction can be dramatically accelerated in microdroplets and that the mechanism behind this phenomenon is not completely clear. Empirically, it is clear that microdroplets are very effective at facilitating and accelerating bimolecular reactions, especially those involving the loss of small molecules such as condensation reactions. Moreover, solvent evaporation and the increased concentrations of acids/bases in microdroplets, as well as the super acidic/basic environment of microdroplets will facilitate reactions such as the Claisen-Schmidt reaction. These considerations help to explain acceleration in the Claisen-Schmidt, Katritzky and Schiff base reactions. However, the Suzuki coupling reaction could be different because it is a homogenous reaction catalyzed by a Pd(0) complex, wherein the reaction rate is highly dependent on the catalyst loading. The microdroplet condition does not increase the catalyst loading but the fast mass transfer in microdroplets can facilitate the renewal of catalytic sites and so increase catalyst efficiency.

Figure 3A:
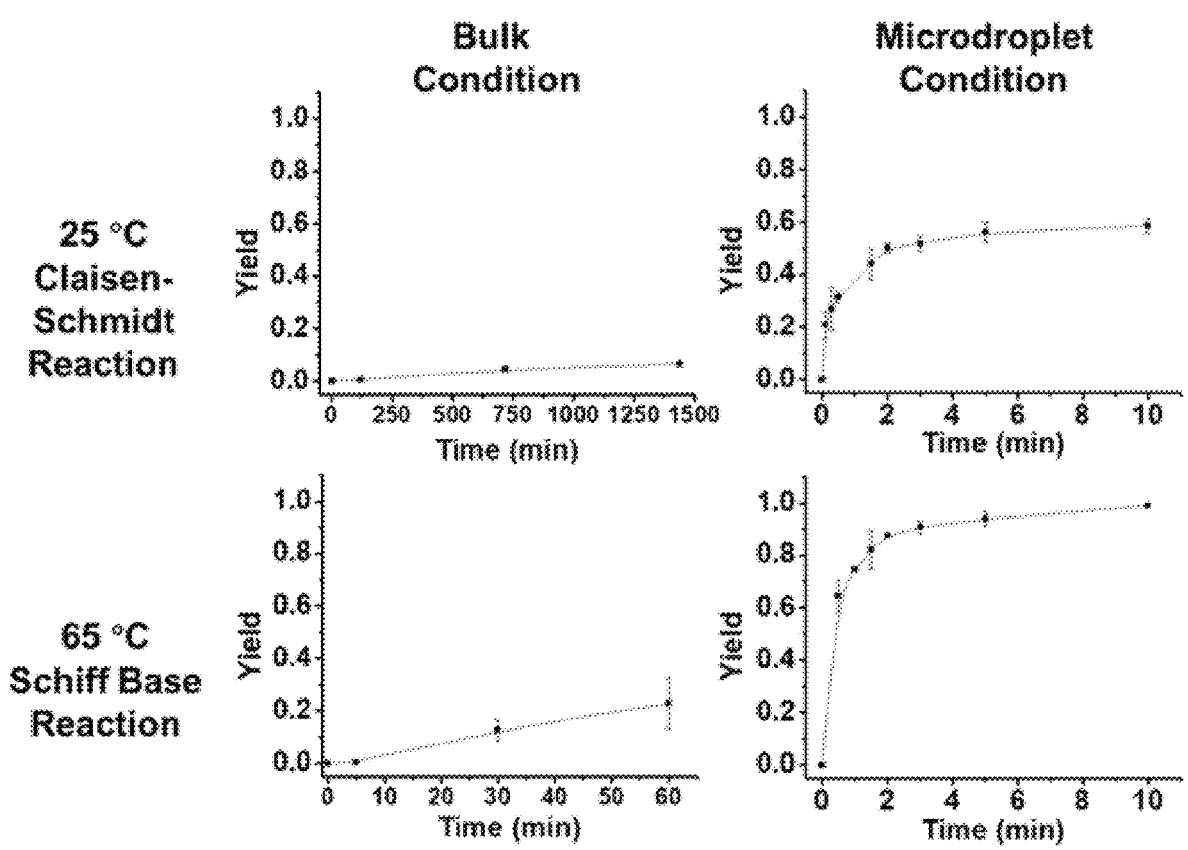
FIGS. 3A-B show yield vs. time behavior of the four reactions under consideration. In order to obtain measurable kinetics curves in bulk, 20 equivalent KOH had to be used as opposed to 2 equiv. in droplets.
Figure 3B:
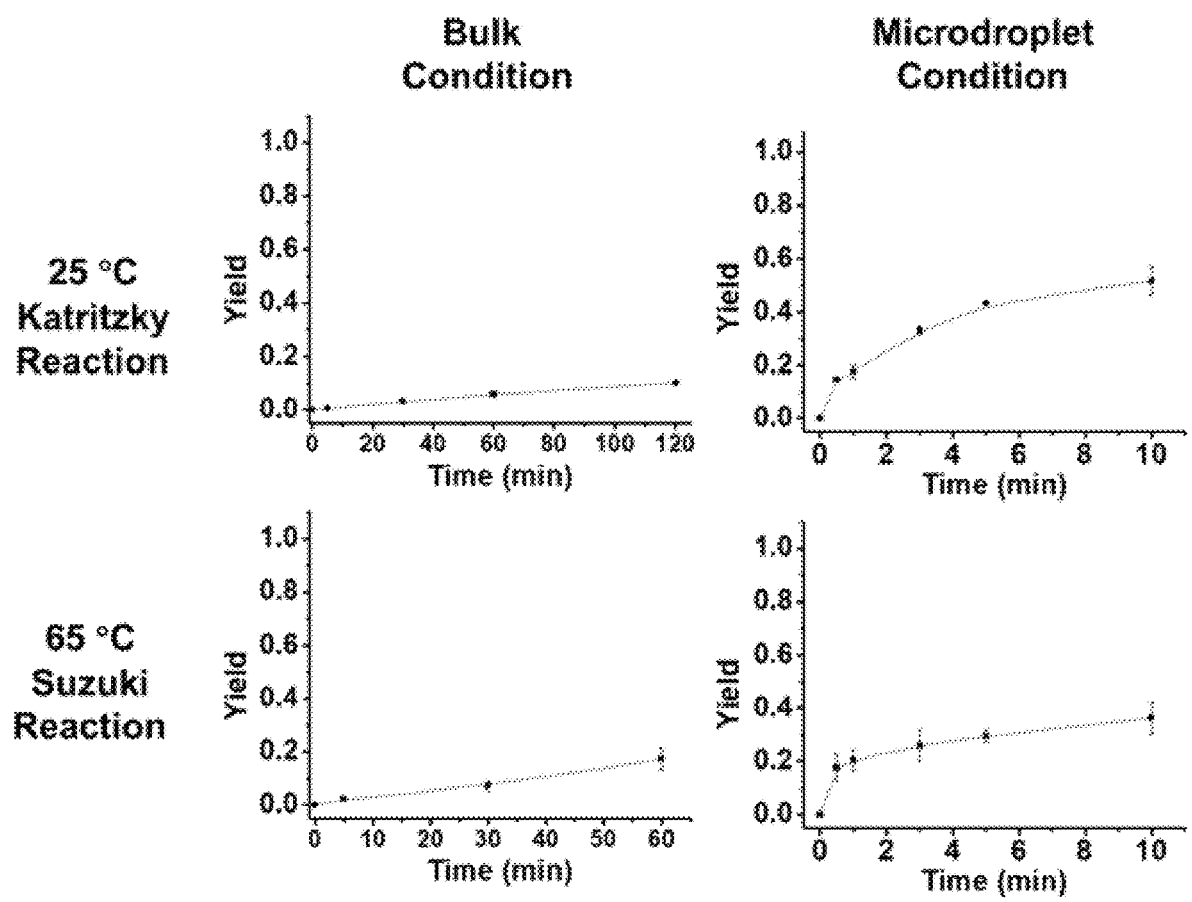

FIGS. 3A-B describes the thermodynamics in the bulk and microdroplet reactors. The first column shows data for the bulk reactions and the second column shows those for the microdroplet reactions. For all four microdroplet reactions, there is a plateau in the plot of yield vs. reaction time that occurs within 10 min, indicating that the reactions approach equilibrium very quickly. For example, the Claisen-Schmidt and Schiff base reactions both have very large AAFs and reach a plateau (maximum yield in microdroplet reaction) within 3 min. The maximum yield after 10 min is 58% for the microdroplet/thin film Claisen-Schmidt reaction however the yield of bulk reaction is only 9%, even with 20×KOH and after 24-hour reaction. The maximum yield is 94% for the microdroplet/thin film Schiff base reaction while the yield in bulk is only 20% after 1-hour reaction. For the Katritzky and Suzuki reactions, with their medium and small AAFs, the plateau in the microdroplet reaction is not as well-defined. The yield after 10 min microdroplet reaction vs. 60 min bulk reaction is 55% vs. 14% for Katritzky reaction and 40% vs. 17% for the Suzuki reaction. Although the yield was improved in the microdroplet reaction, it is still some way from the maximum possible yield, likely due to the lack of reaction time. This is a general drawback of the continuous microdroplet reaction format, which becomes a serious problem in reactions with intrinsically small acceleration factors. In traditional microdroplet/thin film reaction format, reaction time is dependent on spray time and the later the reactants are introduced, the lower is the reaction time. The radical solution to this problem is separation of reagent introduction and solvent introduction into the system so that one can control the reaction scale and microdroplet reaction time appropriately.

To solve the above question, instead of separate introduction of reagents and solvent we added a solvent recycling capability to our microdroplet reaction system. We then compared the microdroplet reaction with and without the solvent recycling option. To compare these two methods, the reagent concentrations (10 mM), reaction time (10 min), reaction scale (3 mL, 30 µmol) and temperature (65° C.) were kept the same. For the simple microdroplet reaction, the flow rate was set to 0.3 mL/min so that 30 µmol of each reactant solution was deposited after 10 min. For the solvent recycling version of the microdroplet reaction, the flow rate was 1 mL/min. In the first 3 min, 3 mL reaction solution (30 µmol) was deposited. Table 1 compares reaction yields with and without the solvent recycling. We see that for the Claisen-Schmidt and Schiff base reactions, two reactions with large AAFs, the yields with and without solvent recycling are similar and very high. However, for reactions with smaller AAFs, solvent recycling improved the yields dramatically, from 33% to 86% for the Katritzky reaction and 32% to 72% for the Suzuki coupling reaction. The higher yields achieved in the solvent recycling reactions are due to the increase of microdroplet reaction time. In the continuous spray microdroplet reaction format, the reaction mixture is gradually introduced to the reaction chamber to allow microdroplet reactions. The later the reaction mixture is introduced, the less microdroplet/thin film reaction time there is. However, in the solvent recycle mode, all reactants are introduced into the chamber within 3 minutes; during the other 7 min, all of the reactants are experiencing accelerated microdroplet and thin film reactions and thus a higher yield is achieved.

TABLE 1

Comparison of the parameters used in normal vs. solvent recycling reactions

| Parameters | Normal Mode | Recycling Mode |
| --- | --- | --- |
| Temperature (° C.) | 65 | 65 |
| Flow rate (mt/min) | 0.3 | 3 |
| Concentration (mM) | 10 | 10 |
| Volume Transferred (mL) | 3 | 3 |
| Reaction Time (min) | 10 | 10 |
| Valve 1 (reaction solution reservoir) | Always on | On (0 to 3 min) |
| Valve 2 (condensation chamber) | Always off | On (3 to 10 min) |

TABLE 2

Recycling/no recycling 10 min reactions

| | Yield (%) | |
| --- | --- | --- |
| Reaction Type | Normal Mode | Recycling Mode |
| Claisen-Schmidt Reaction | 92 | 93 |
| Katritzky Reaction | 33 | 86 |
| Schiff Base Formation | 98 | 100 |
| Suzuki Coupling Reaction | 32 | 72 |

Figure 4A:
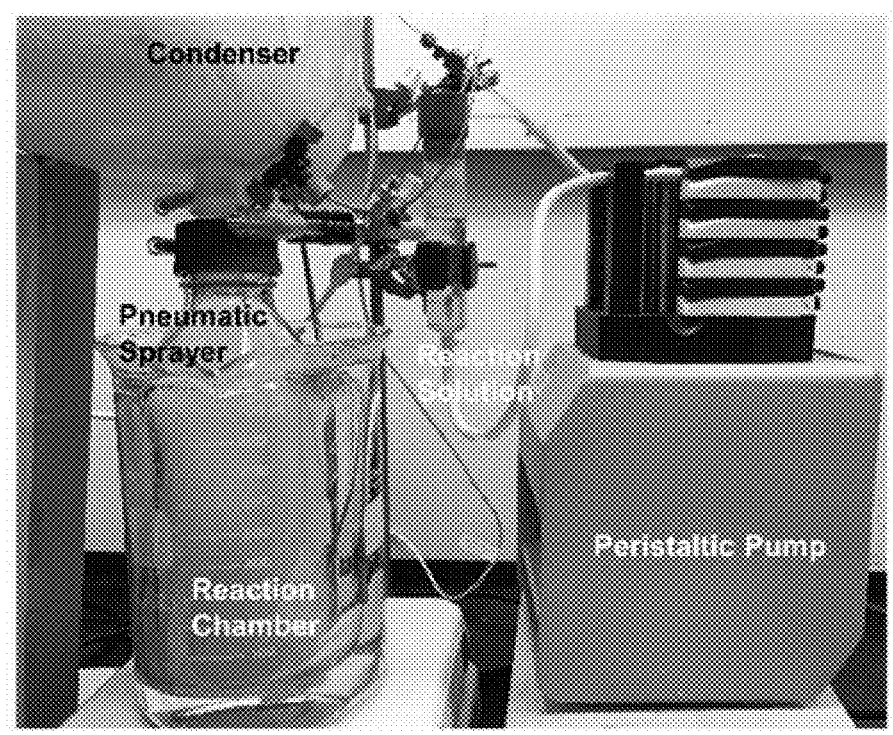
FIG. 4A shows a photograph of the scaled-up microdroplet/thin film reaction system for Claisen-Schmidt reaction.
Figure 4B:
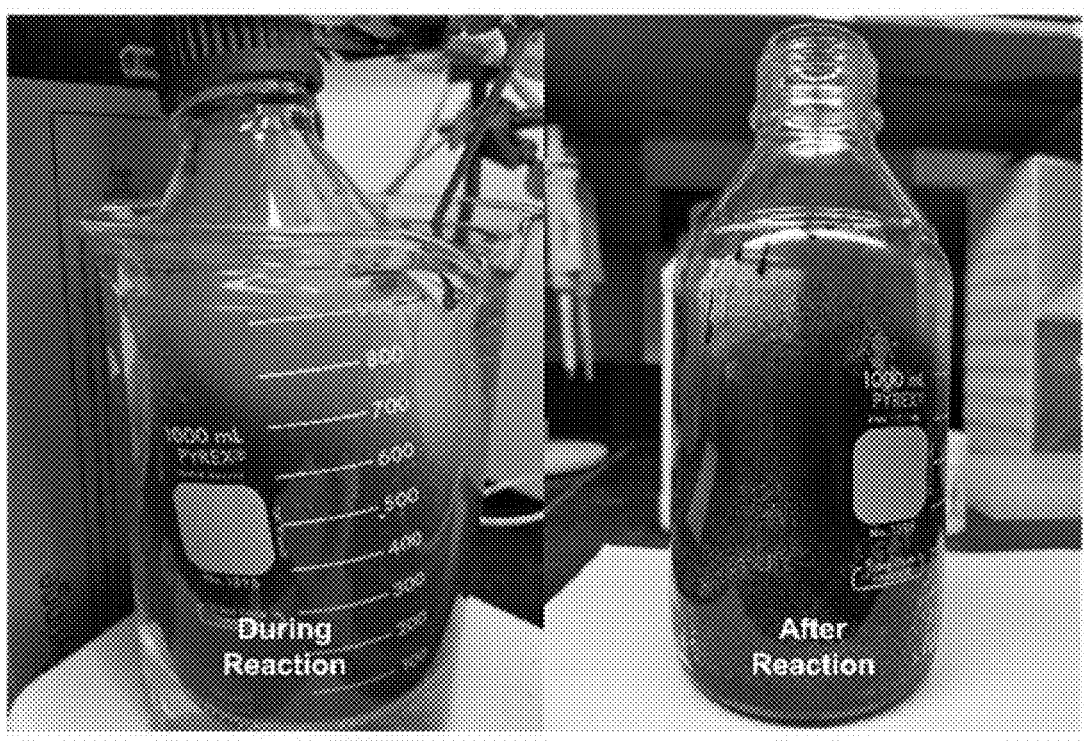
FIG. 4B shows a photograph of a reaction chamber during/after reaction.
Figure 4C:
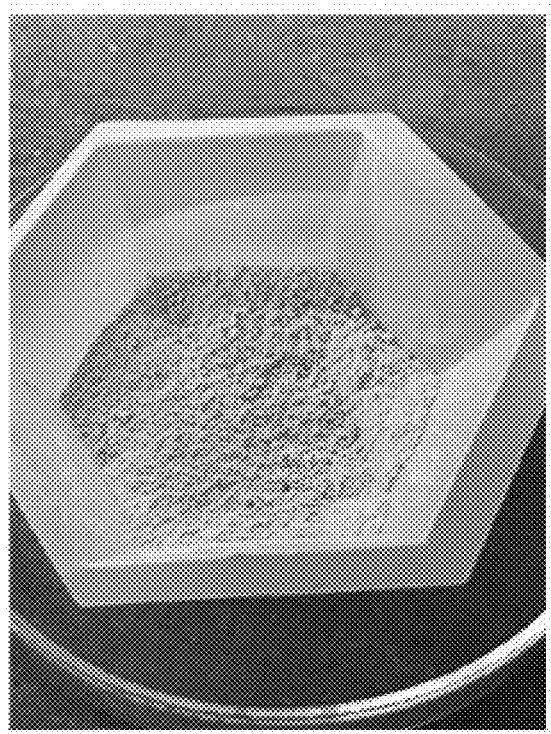
FIG. 4C shows a photograph of the purified product.

We chose the Claisen-Schmidt reaction to test the capability to perform reactions on the gram/hour scale. The photos in FIGS. 4A-C show the instrumental setup, the reaction chamber during reaction/after reaction and the purified product acquired after the reaction. In this experiment 30 mL of the fresh mixed reaction solution (0.2 M 6-hydroxyindanone, 0.2 M 2-methoxybenzaldehyde and 0.4 M KOH) was transferred into reaction chamber at a flow rate of 2 mL/min. After 15 min, solvent recycling was started and run for 15 min. In total, the reaction took half an hour. All of the mixture in the reaction chamber was then washed with 15 mL 2 M hydrochloride solution twice and then with 15 mL water once. The washed product was dried in an incubator at 35° C. overnight. The dried powder was weighed as 1.38 g (isolated yield of 87%). A small fraction of the powder was diluted by MeOH (with 1 mM DMAP for ionization in negative mode) to 1 mM for nESI-MS analysis. Another small fraction of the product was dissolved deuterated DMSO for NMR analysis. All the spectra indicate a very high purity of the isolated product.

Additional Aspects of System

Without being limited by an particular theory or mechanism of action, it is believed that repeatedly spraying, collecting the sprayed material, and re-spraying should build up product even if product formation is incomplete in a single spray event. Collection of the droplets and evaporated solvent is economical and avoids undesirable solvent waste. In certain embodiments, a combination of condensation of vapor and electrical precipitation of droplets is a means of collection of neutral vapor and charged particulates. The latter, with their cargo of product, can also be collected separately in an electrostatic precipitator.

In general, the systems of the invention can include a spray system in which pneumatics and optionally electrical potential are used to create a fine spray, for example an electrosonic spray ionization source, such as described for example in Takats et al. (Anal. Chem., 2004, 76 (14), pp 4050-4058), the content of which is incorporated by reference herein in its entirety. The skilled artisan will recognize that any source that generates a liquid spray discharge including small droplets (e.g., microdroplets), charged or uncharged, can be used with systems and methods of the invention.

Additional exemplary ionization sources include techniques that utilize ionization sources at atmospheric pressure for mass spectrometry include electrospray ionization (ESI; Fenn et al., Science, 246:64-71, 1989; and Yamashita et al., J. Phys. Chem., 88:4451-4459, 1984); atmospheric pressure ionization (APCI; Carroll et al., Anal. Chem. 47:2369-2373, 1975); and atmospheric pressure matrix assisted laser desorption ionization (AP-MALDI; Laiko et al. Anal. Chem., 72:652-657, 2000; and Tanaka et al. Rapid Commun. Mass Spectrom., 2:151-153, 1988). The content of each of these references in incorporated by reference herein its entirety.

Other exemplary mass spectrometry techniques that work with systems and methods of the invention utilize direct ambient ionization/sampling methods that include direct analysis in real time (DART; Cody et al., Anal. Chem., 77:2297-2302, 2005); Atmospheric Pressure Dielectric Barrier Discharge Ionization (DBDI; Kogelschatz, Plasma Chemistry and Plasma Processing, 23:1-46, 2003, and PCT international publication number WO 2009/102766), and electrospray-assisted laser desorption/ionization (ELDI; Shiea et al., J. Rapid Communications in Mass Spectrometry, 19:3701-3704, 2005). The content of each of these references in incorporated by reference herein its entirety.

In certain embodiments, microdroplets of a sample are generated using nanospray ESI. Exemplary nano spray tips and methods of preparing such tips are described for example in Wilm et al. (Anal. Chem. 2004, 76, 1165-1174), the content of which is incorporated by reference herein in its entirety. NanoESI is described for example in Karas et al. (Fresenius J Anal Chem. 2000 March-April; 366 (6-7): 669-76), the content of which is incorporated by reference herein in its entirety.

The system may also include a collector. That collector may include one or more of the following components. A condenser, such as a cryogenic condenser, may be used in the collector in order to collect vapor phase products. In certain embodiments, that is all that is required for collection of reaction product within the liquid spray discharge. In other embodiments, the collector also includes a liquid degassing unit. An exemplary liquid degassing unit is a semi-permeable membrane (e.g. silicone polymer) within a vacuum chamber. For example, dimethylsiloxane tubing allows pervaporation of the pneumatic gas into the rough pump vacuum. Such a unit allows the gas used as the source of pneumatic power to create the sprayed droplets to escape the closed system. The collector may also include an electrostatic precipitator with appropriate applied potentials to collect small charged droplets and then either wash them back into the main spray reservoir or collect this product-rich material into a separate container. An exemplary electrostatic precipitator is commercially available from Clarcor. Another exemplary electrostatic precipitator utilizes negatively charged silver wires, as illustrated in U.S. patent application Ser. No. 15/673,658, the content of which is incorporated by reference herein in its entirety.

As discussed, the valving in the system is configured to interface with a recirculation line that connects the collector and the pneumatic sprayer. In that manner, the unreacted molecules and the reaction product are recycled through the pneumatic sprayer, thereby allowing a plurality of the unreacted molecules to react with each other as the unreacted molecules cycle again through the system.

The Venturi effect, as described in Santos et al. (*Analytical Chemistry* 2011, 83 (4), 1375-1380), can be used to drive flow through the recirculation loop by making the recirculation loop using a Venturi tube. Alternatively, the recirculation loop can be operably associated with a pump that drives flow from the collector back to the pneumatic sprayer. Since systems of the invention may be closed-loop system, in certain embodiments, the components of the pneumatic sprayer drive flow through the entire system.

In certain embodiments, the systems of the invention include the components shown in FIG. 1. In this embodiment, the pneumatic sprayer may include a high voltage source so that the produced liquid spray discharge is a charged liquid spray discharge. The high voltage source is an optional component of the pneumatic sprayer and in certain embodiments, a liquid spray discharge is produced without the need for a high voltage source. In certain embodiment though, pneumatics and electrical potential are used to create a fine spray from a capillary, typically ID 100 microns.

The solvent introduced to the system includes molecules for a reaction, e.g., reactants. Any reactants can be used with systems and methods of the invention, e.g., organic or inorganic reactants. The solvent merely needs to be compatible with the reactants and the system. The solvent flows through the pneumatic sprayer and a liquid spray discharge including the reactants is produced. A portion of the reactants react with each other in the liquid spray discharge to produce a reaction product.

The reaction chamber is positioned to receive the liquid spray discharge as shown in FIG. 1. The liquid spray discharge includes reaction product and unreacted molecules. When the liquid spray discharge is introduced to the reaction chamber, the liquid spray discharge includes the reaction product and any unreacted molecules.

An aspect of the invention recognizes that to increase a yield of the reaction, the solvent including the reaction product and any unreacted molecules created in the reaction chamber can be recirculated through the system via manipulation of the valves. In that manner, unreacted molecules are given a chance to react and incomplete reactions can be driven to completion, thereby increasing the yield of the chemical reaction. To accomplish that, the systems of the invention include a recirculation loop and valves as shown in FIG. 1. The recirculation loop and valves connects the reaction chamber to the pneumatic sprayer to allow the solvent including the reaction product and any unreacted molecules to be re-sprayed by the pneumatic sprayer. The embodiment shown in FIG. 1 may use the Venturi effect to drive flow through the recirculation loop. As already discussed above, the skilled artisan will recognize that other mechanisms can be used to drive flow through the system.

Once the reaction is determined or deemed to be completed, the valves are adjusted such that flow from the reaction chamber is redirected from the reaction chamber to the condensation chamber.

Mass Spectrometry Interface

In certain embodiments, the systems of the invention may be interfaced with a mass spectrometer, such as a bench-top or miniature mass spectrometer, such as described for example in Gao et al. (Z. Anal. 15 Chem. 2006, 78, 5994-6002), Gao et al. (Anal. Chem., 80:7198-7205, 2008), Hou et al. (Anal. Chem., 83:1857-1861, 2011), Sokol et al. (Int. J. Mass Spectrom., 2011, 306, 187-195), Xu et al. (JALA, 2010, 15, 433-439); Ouyang et al. (Anal. Chem., 2009, 81, 2421-2425); Ouyang et al. (Ann. Rev. Anal. Chem., 2009, 2, 187-25 214); Sanders et al. (Euro. J. Mass Spectrom., 2009, 16, 11-20); Gao et al. (Anal. Chem., 2006, 78 (17), 5994-6002); Mulligan et al. (Chem.Com., 2006, 1709-1711); and Fico et al. (Anal. Chem., 2007, 79, 8076-8082), the content of each of which is incorporated herein by reference in its entirety.

An exemplary miniature mass spectrometer is described, for example in Gao et al. (Anal. Chem. 2008, 80, 7198-7205.), the content of which is incorporated by reference herein in its entirety. In comparison with the pumping system used for lab-scale instruments with thousands of watts of power, miniature mass spectrometers generally have smaller pumping systems, such as a 18 W pumping system with only a 5 L/min (0.3 m3/hr) diaphragm pump and a 11 L/s turbo pump for the system described in Gao et al. Other exemplary miniature mass spectrometers are described for example in Gao et al. (Anal. Chem., 2008, 80, 7198-7205.), Hou et al. (Anal. Chem., 2011, 83, 1857-1861.), PCT/US17/26269 to Purdue Research Foundation, and Sokol et al. (Int. J. Mass Spectrom., 2011, 306, 187-195), the content of each of which is incorporated herein by reference in its entirety.

The mass spectrometer may be interfaced online with the system or used off-line. In on-line embodiments, a tube can be connected to the reaction chamber and/or the condenser and/or the recirculation line. A portion of the solvent is diverted from the system and to the mass spectrometer. In such embodiment, the flow can go directly into another pneumatic sprayer, including a paper spray probe as described for example in U.S. Pat. No. 8,859,956, the content of which is incorporated by reference herein in its entirety, in order to generate a discharge that can be sent into the mass spectrometer.

In off-line embodiments, a portion of solvent is obtained from the electrostatic precipitator, the condenser, or the recirculation line and then analyzed by mass spectrometry.

System Architecture

In certain embodiments, the systems and methods of the invention can be carried out using automated systems and computing devices. Specifically, aspects of the invention described herein can be performed using any type of computing device, such as a computer, that includes a processor, e.g., a central processing unit, or any combination of computing devices where each device performs at least part of the process or method. In some embodiments, systems and methods described herein may be controlled using a handheld device, e.g., a smart tablet, or a smart phone, or a specialty device produced for the system.

Systems and methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections).

Processors suitable for the execution of computer program include, by way of example, both general and special purpose microprocessors, and any one or more processor of any kind of digital computer. Generally, a processor will receive instructions and data from a read-only memory or a random access memory or both. The essential elements of computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, solid state drive (SSD), and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having an I/O device, e.g., a CRT, LCD, LED, or projection device for displaying information to the user and an input or output device such as a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected through network by any form or medium of digital data communication, e.g., a communication network. For example, the reference set of data may be stored at a remote location and the computer communicates across a network to access the reference set to compare data derived from the female subject to the reference set. In other embodiments, however, the reference set is stored locally within the computer and the computer accesses the reference set within the CPU to compare subject data to the reference set. Examples of communication networks include cell network (e.g., 3G or 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art.

A computer program does not necessarily correspond to a file. A program can be stored in a file or a portion of file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over a network (e.g., as packets being sent from a server to a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user. In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file are well-known in the art and, for example, can be invoked manually or automatically by a program or by a save command from software or a write command from a programming language.

Suitable computing devices typically include mass memory, at least one graphical user interface, at least one display device, and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD) or other optical storage, magnetic cassettes, magnetic tape, magnetic disk storage or other magnetic storage devices, Radiofrequency Identification tags or chips, or any other medium which can be used to store the desired information and which can be accessed by a computing device.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

Figure 5:
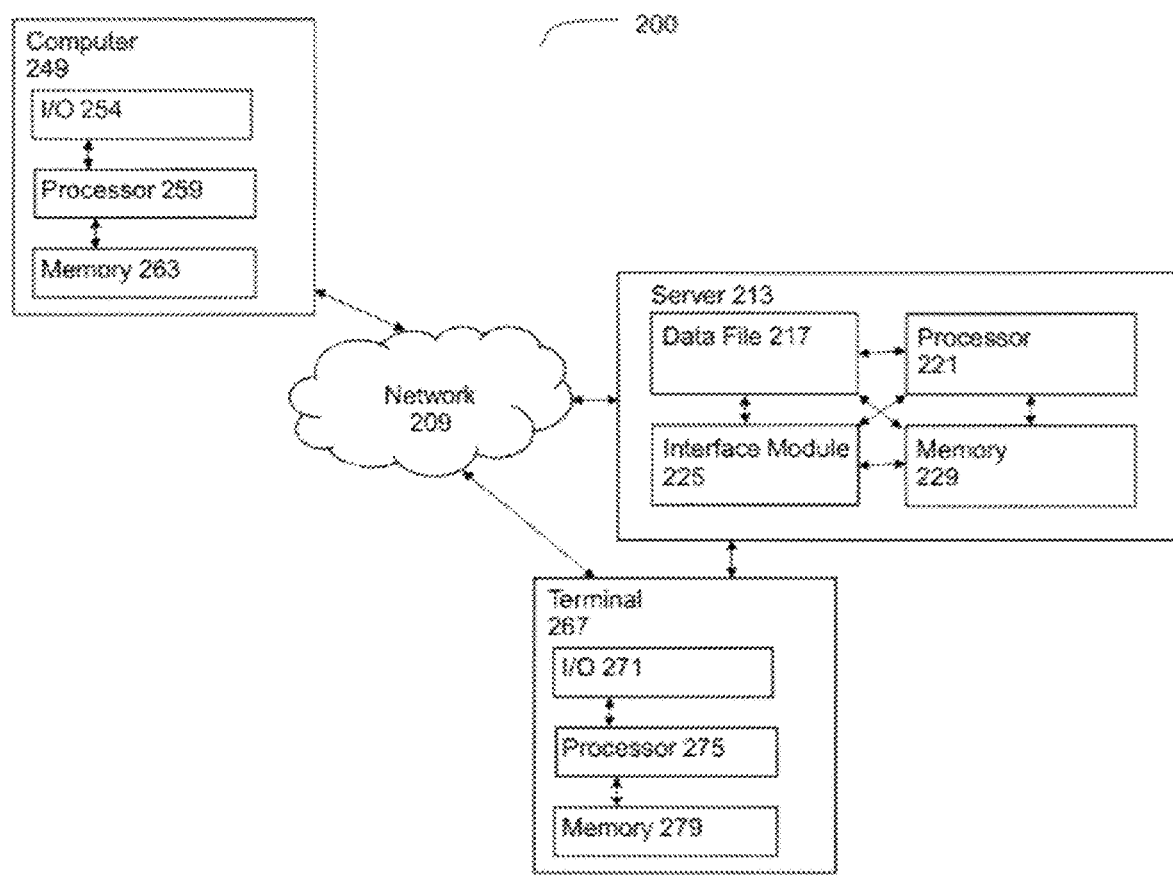
FIG. 5 is an illustration showing an exemplary data analysis module for implementing the systems and methods of the invention in certain embodiments.

In an exemplary embodiment shown in FIG. 5, system 200 can include a computer 249 (e.g., laptop, desktop, or tablet). The computer 249 may be configured to communicate across a network 209. Computer 249 includes one or more processor 259 and memory 263 as well as an input/output mechanism 254. Where methods of the invention employ a client/server architecture, steps of methods of the invention may be performed using server 213, which includes one or more of processor 221 and memory 229, capable of obtaining data, instructions, etc., or providing results via interface module 225 or providing results as a file 217. Server 213 may be engaged over network 209 through computer 249 or terminal 267, or server 213 may be directly connected to terminal 267, including one or more processor 275 and memory 279, as well as input/output mechanism 271.

System 200 or machines according to the invention may further include, for any of I/O 249, 237, or 271 a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Memory 263, 279, or 229 according to the invention can include a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

EXAMPLES

We have designed a semi-closed system for accelerated microdroplet reactions with solvent recycling capabilities. In this system, microdroplet reactions occur in a chamber housed in a water bath, which is separated from the ambient environment by a cold trap housed in a dry ice bath. The semi-closed system improves microdroplet reaction yields in three ways: i) the reaction chamber increases the collection efficiency of small micro- or nanodroplets, enhancing the reaction acceleration factor relative to open systems; ii) the cold trap allows carrier gas to pass into the air but captures microdroplets entrained reagents, products and solvents, and works with the peristaltic pump to recycle the condensate so improving the isolated yield in synthesis; iii) solvents can be recycled to achieve longer microdroplet reaction times, which increases yields, especially for those reactions with small acceleration factors. This system supports flow rates ranging from 0.1 mL/min to 2 mL/min, corresponding to the flexible synthetic scale of milligrams to grams per hour. We have performed the Claisen-Schmidt reaction at a scale of 3.18 g/hr with subsequent purification showing an isolated yield of 86.8%. This large scale and high isolation yield emphasize the synthetic potential of microdroplet reactions. We believe this system has the potential to provide new synthesis solutions to the pharmaceutical and chemical industry although we recognize that implementation of multi-step syntheses still lies ahead.

What is claimed is:

1. A method of producing a reaction product,
using a multi-mode reaction system comprising a pneumatic sprayer, a pump, one or more reagent reservoirs, a first heated reaction chamber, a second cooled condenser chamber and one or more valves, the multi-mode reaction system having a first mode in which the pump and the one or more valves cause reagents to flow from one or more reagent reservoirs and through a pneumatic sprayer to generate a reaction product via microdroplet formation and thin film reactions and second mode in which the one or more valves change the reaction product and unreacted reagents flow within the multi-mode system, isolate the one or more reagent reservoirs from other remaining sections of the multi-mode system and recycle the reaction product and the unreacted reagents back through the multi-mode reaction system to increase a yield of the reaction;
the method comprising:
with the one or more valves in the first mode, generating a reaction product via microdroplet formation and thin film reactions by flowing the reagents from the one or more reagent reservoirs through the pneumatic sprayer and into the first heated reaction chamber;
condensing the reaction product and the unreacted reagents in the second cooled condenser chamber by flowing the reaction product and the unreacted reagents from the first heated reaction chamber into the second cooled condenser chamber;
changing the reaction product and the unreacted reagents flow within the multi-mode system and isolating the one or more reagent reservoirs from the other sections of the multi-mode system by switching the one or more valves from the first mode to the second mode; and
with the one or more valves in the second mode, increasing the yield of the reaction by recycling the reaction product and the unreacted reactant back through the pneumatic sprayer, the first heated reaction chamber and the second cooled condenser chamber by causing the reaction product and the unreacted reactants to flow back from the second cooled condenser chamber and through the pneumatic sprayer.

2. The method of claim 1, wherein the one or more valves comprises a first valve and a second valve wherein the first valve is disposed between the one or more reagent reservoirs and a pump and the second valve is disposed between the pneumatic sprayer and the pump.

3. The method of claim 2, wherein in the first mode, the first valve is open and the second valve is closed.

4. The method of claim 2, wherein, in the second mode, the second valve is open and the first valve is closed.

5. The method of claim 2, wherein the generating the reaction product via microdroplet formation and thin film reactions comprises producing droplets of the reagents in a first reaction reservoir by producing a pneumatic spray of the reagents in the first reaction reservoir with the multi-mode reaction system further comprising the first reaction reservoir and a channel coupled to a gas line, the channel located after the pump, the channel configured to produce a pneumatic spray of the reagents into the first reaction reservoir to thereby produce droplets of the reagents in the first reaction reservoir, wherein a reaction rate of the reagents within the droplets in the first reaction reservoir is greater than a reaction rate of the reagents under a bulk state, wherein in the bulk state no droplets are formed.

6. The method of claim 1, wherein the increasing the reaction yield of the reaction is performed with the multimode reaction system comprising a second reaction reservoir and a channel operably coupled to a second valve of the one or more valves and by flowing the reaction product and the unreacted reactants from the second reaction reservoir and through the channel operably coupled to the second valve and back through the pump, wherein the second valve is in an open position and a first valve of the one or more valves is in a closed condition.

7. The method of claim 1, wherein the generating the reaction product via microdroplet formation and thin film reactions is performed with the reagents in a single reaction reservoir.

8. The method of claim 7, wherein the generating the reaction product via microdroplet formation and thin film reactions is performed with the reagents in multiple reaction reservoirs.

\* \* \* \* \*